Nov. 28, 1950

A. G. HUPP 2,532,230

MOWER DAMPENING HITCH

Filed Nov. 6, 1948

INVENTOR.
Arleigh G. Hupp
By
Andrus & Sceales
Attorneys

Nov. 28, 1950 — A. G. HUPP — 2,532,230
MOWER DAMPENING HITCH
Filed Nov. 6, 1948 — 3 Sheets-Sheet 2

INVENTOR.
Arleigh G. Hupp
BY Andrus & Sceales
Attorneys

Nov. 28, 1950     A. G. HUPP     2,532,230
MOWER DAMPENING HITCH
Filed Nov. 6, 1948     3 Sheets-Sheet 3
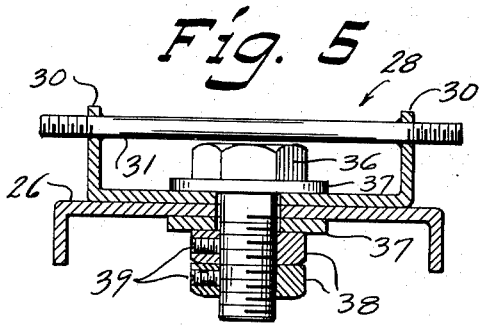
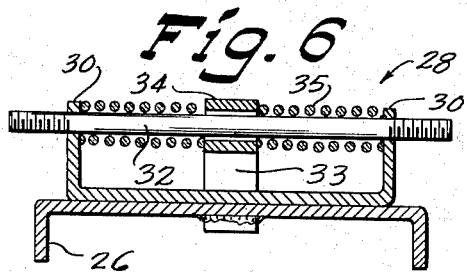
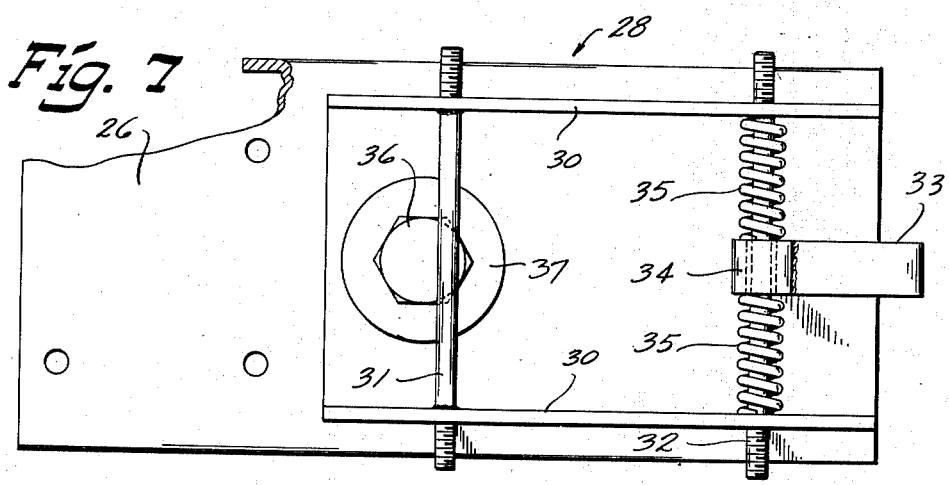
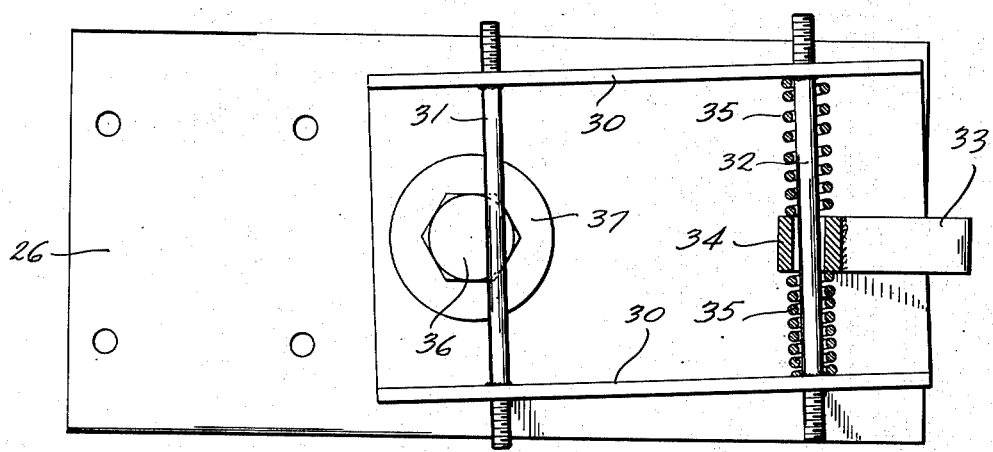
INVENTOR.
Arleigh G. Hupp
BY
Andrus & Scales
Attorneys Patented Nov. 28, 1950

2,532,230

UNITED STATES PATENT OFFICE 2,532,230

MOWER DAMPENING HITCH

Arleigh G. Hupp, South Milwaukee, Wis., assignor to The Midland Co., South Milwaukee, Wis., a corporation of Wisconsin Application November 6, 1948, Serial No. 58,739

4 Claims. (Cl. 56—26.5)

This invention relates to a hitch and particularly has reference to a vibration cushioning or dampening hitch to be employed with small garden tractors in connecting the same to the implement to be driven by the tractor.

The principal object of the invention is to provide a hitch which dampens vibration of the implement to which the tractor is connected and thereby eliminates transmission of the greater part of the vibration to the operator of the tractor.

Another object is to provide a hitch which substantially reduces transmission of vibration from the driven implement to the tractor to improve the life of the tractor parts.

Another object is to provide a vibration dampening hitch for employment between driving and driven apparatus to connect the same and which acts in operation to reduce transmission of vibratory shocks from the driven to the driving apparatus.

A further object is to provide a hitch which counters and absorbs the reaction resulting from change of direction of the cutting mechanism of a sickle or the like.

These and other objects of the invention will appear hereinafter in connection with the following description of an embodiment of the invention as illustrated in the accompanying drawings.

In the drawings:

Fig. 5 is a section on line 5—5 of Fig. 4;

Fig. 6 is a section on line 6—6 of Fig. 4;

Fig. 7 is a top plan view of the hitch; and

Fig. 8 is a top plan view with the hitch pivoted in service.

Figure 1:
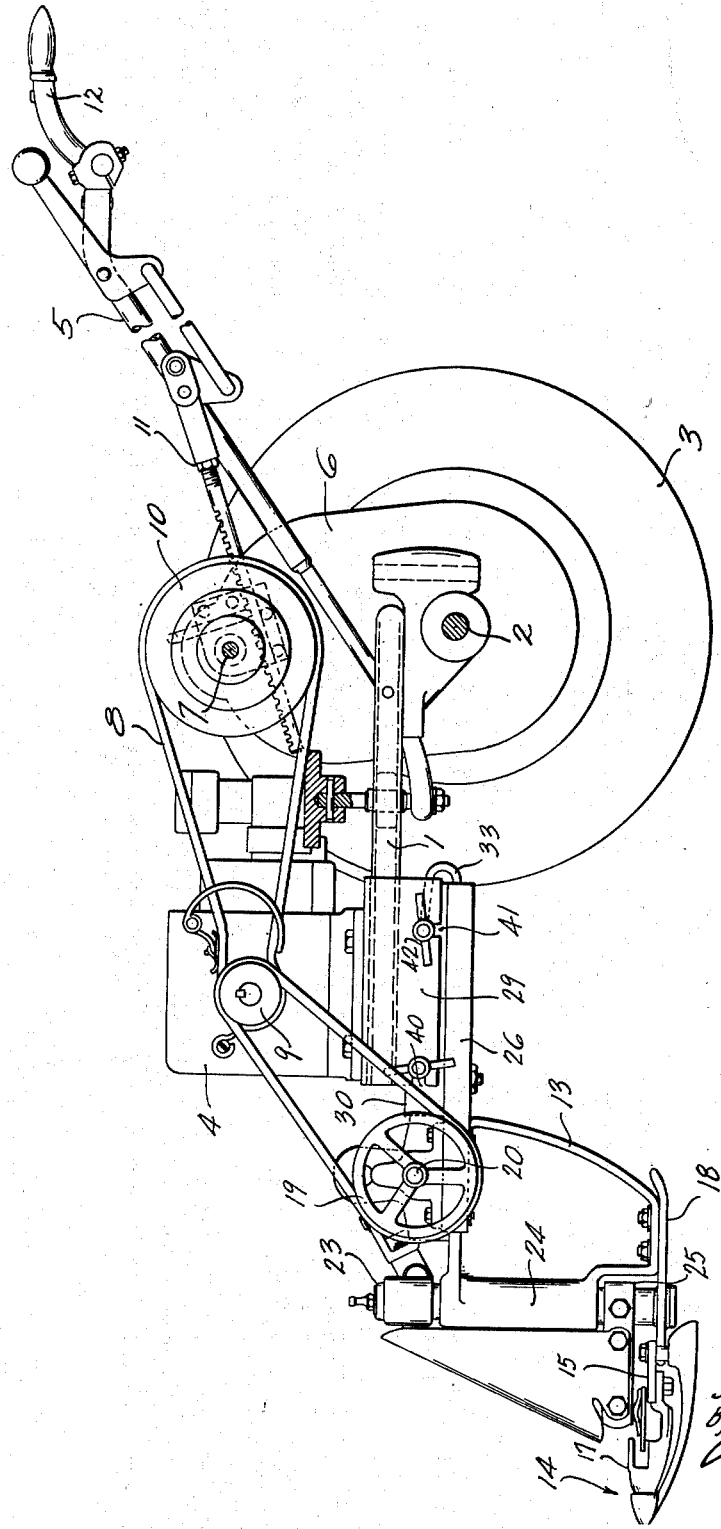
Figure 1 is a side elevation of a two wheel garden tractor with a sickle bar mower hitched thereto.

To illustrate employment of the hitch of the invention there is shown in Fig. 1 a sickle bar mower secured to a small two wheel garden tractor.

The tractor comprises in general a frame 1 which is carried by a transverse axle 2, and a pair of drive wheels 3 secured to the opposite ends of the axle.

Frame 1 has a forwardly projecting platform for supporting a small engine 4 and a rearwardly and upwardly extending handle bar 5 for guiding of the tractor by the operator.

The gear transmission 6 extends upwardly from axle 2 to a horizontal drive shaft 7 which extends transversely of the frame 1. Drive shaft 7 is driven from engine 4 by V-belt 8, a drive sheave 9 on the engine shaft and a driven sheave 10 on the drive shaft 7.

Sheaves 9 and 10 are provided with multiple grooves and in sheave 10 the sheave sections are of different diameter to provide for different power and speed ratios by shifting belt 8 from one sheave to another.

Transmission 6 pivots on axle 2 to tighten or loosen belt 8. Control rod 11 carried by handle bar 5 and operated by lever 12 at the upper end of the handle bar effects the pivotal movement of transmission 6. The pivoting of the transmission and the mechanism provided for starting the tractor under substantial load are fully described in the copending application of the present inventor referred to above and need not be described here as they form no part of the invention.

Figure 2:
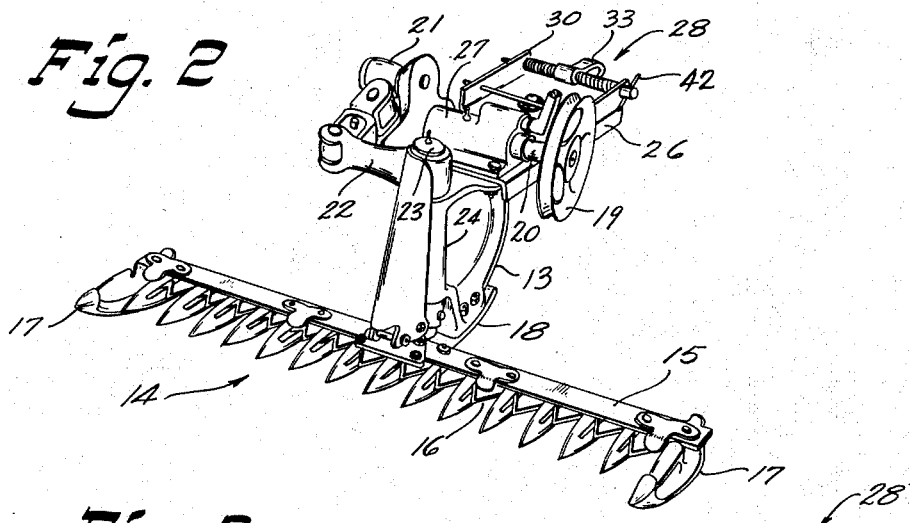
Fig. 2 is a perspective view of the sickle bar mower with the hitch of the invention secured thereto.
Figure 3:
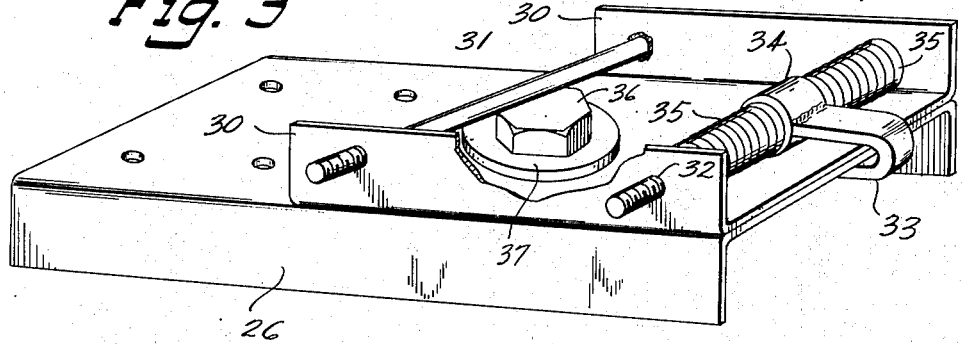
Fig. 3 is a perspective view of the hitch of the invention.
Figure 4:
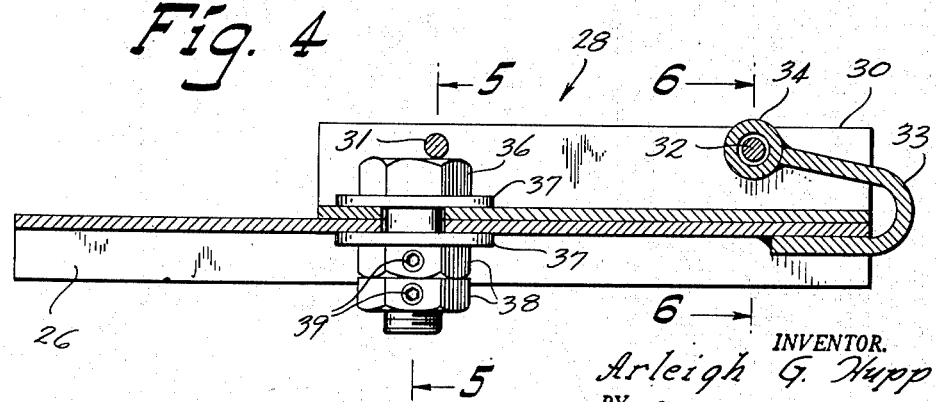
Fig. 4 is a side elevation of the hitch with parts broken away and sectioned.

The sickle bar mower shown in Figs. 1 and 2 comprises a main bracket or saddle 13 upon which is supported the sickle bar parts. In general these parts comprise the sickle bar assembly 14 at the forward end of the apparatus and which is made up of a main bar 15 and a cutter bar 16 extending between supporting end shoes 17 and carrying forwardly projecting teeth. The bars are moved sideways for mowing and cleaning operations with the teeth thereon. The sickle bar assembly 14 is supported from the bottom of main bracket 13 by a forwardly extending plate 18.

The mechanism for driving the sickle bar assembly 14 from engine 4 on the tractor comprises a drive pulley 19 driven from sheave 9 on engine 4 of the tractor and which in turn rotates a shaft 20 to drive pitman assembly 21, and the actuating arm 22 the inner end of which is secured to a vertical drive shaft 23 extending within tubular housing 24 on the forward end of the main bracket 13.

The drive arm 25 connects vertical shaft 23 to cutter bar 16 to actuate cutter bar 16 sidewise relative to main bar 15 upon rotation of shaft 23 from engine 4 through the various parts described.

A plate 26 with downwardly extending longitudinal side flanges extends rearwardly from main bracket 13 as part of the frame of the sickle bar and bolts extend through the forward end of plate 26 and the housing 27 of pulley shaft 20 disposed on top of plate 26 to bolt housing 27 and plate 26 to main bracket 13. Further details of the sickle bar need not be described.

Actuation of the mower establishes a substantial vibration therein which normally is transmitted to the tractor resulting in considerable agitation and shaking of the parts of the tractor and also tending to shake or vibrate the operator as he grasps handle bar 5 and lever 12 to manipulate the apparatus in service.

To dampen this vibration the cushioning hitch 28 is provided on the rear portion of plate 26 of the mower for connection to the downwardly flanged upper mounting member 29 which is secured to the tractor frame 1.

Hitch 28 comprises a web having upwardly directed longitudinally extending side flanges 30. A pair of parallel transverse horizontal bars 31 and 32 pass through the flanges 30 and are welded thereto. The bars 31 and 32 are spaced apart longitudinally of hitch 28 and lie preferably in a common plane, bar 31 being the front bar and bar 32 being the rear bar of the hitch.

A retaining arm 33 has a bearing ring 34 on one end fitting loosely around rear bar 32 centrally thereof. The arm 33 curves outwardly from bearing 34 and downwardly underneath the plate 26 of the mower and is welded centrally to the rear end portion of plate 26.

Coil spacer springs 35 are assembled over rear bar 32 on each side of ring 34 between ring 34 and flanges 30 of hitch 28.

The short bolt 36 extends through the central rear portion of hitch member 28 and also through the web of plate 26. Washers 37 are provided directly beneath the head of bolt 36 and beneath plate 26. A pair of jam nuts 38 are threaded onto the lower end of bolt 36 and are secured against turning by set screws 39. Short bolt 36 fits loosely in the holes in hitch 28 and plate 26 to enable hitch 28 to pivot on plate 26 in service.

The outward curve of retaining arm 33 from hitch 28 and plate 26, as described, is sufficient to permit hitch 28 to pivot on bolt 36 and shift sidewise in either direction against coil springs 35 in service. In addition, as illustrated in Fig. 8, the clearance in a horizontal plane between bar 32 and ring 34 permits displacement of hitch 28 against springs 35 relative to fixed plate 26 to absorb shocks in service.

For the purpose of assembly of hitch 28 to mounting member 29 on frame 1 of the tractor, the hitch 28 is of a width to fit within the flanges of mounting member 29. In addition the side flanges of mount 29 are each provided with a forward slot 40 and a rear slot 41 to receive the corresponding front and rear bars 31 and 32. Clamping means such as wing nuts 42 may be threaded onto the corresponding ends of bars 31 and 32 to secure the hitch and mounting members together.

Slots 40 and 41 are specially formed to enable assembly and disassembly of bars 31 and 32 therein.

In operation when the tractor and cutting mechanism, in this case a sickle bar mower, are hitched together by the hitch of the invention, vibrations of the mower tend to be absorbed or cushioned by hitch 28 and reactions tending to shake the tractor and operator upon change of direction of the cutting mechanism are absorbed by hitch 28 as the same pivots on plate 26 against coil springs 35.

The invention thus gives greater comfort to the operator in the operation of the mechanism and also substantially increases the life of the tractor parts by dampening the vibratory shocks to which such parts are normally subjected.

Various embodiments of the invention may be employed within the scope of the accompanying claims.

I claim:

1. A hitch for connecting the frames of a driven member and a driving member to operate the same together in service, which comprises a web having upwardly directed longitudinally extending side flanges, means securing the hitch to the frame of the driving member, a pivot member pivoting the forward end portion of the hitch to the frame of the driven member for pivotal movement thereover, and a retaining arm secured at one end to the frame of the driven member underlying the hitch and biased at the other end against the flanges of the hitch to cushion movement of the hitch in pivoting over the frame of the driven member in service.

2. A hitch for connecting the frames of a driven member and a driving member to operate the same together in service, which comprises a web having upwardly directed longitudinally extending side flanges, a pivot member securing the forward end portion of the hitch to the frame of the driven member to pivot the hitch thereon, a bar extending between the flanges of the hitch near the end adjacent the driving member, means securing the hitch to the frame of the driving member, a retaining arm loosely assembled at one end of said bar and secured at the other end to the frame of the driven member underlying said hitch, and biasing means disposed between said arm and the flanges of the hitch to receive and cushion movement of the hitch in pivoting over the frame of the driven member in service.

3. A hitch for connecting the frames of a driven member and a driving member to operate the same together in service which comprises a substantially horizontal web having upwardly directed longitudinally extending side flanges, a pair of horizontally spaced transverse parallel bars passing through the flanges of said hitch and being secured thereto, means securing said bars to the frame of the driving member, pivot means securing the forward end portion of the hitch to the frame of the driven member to pivot the hitch thereon, a retaining arm loosely assembled at one end on the rear parallel bar of the hitch and secured at the other end to the frame of the driven member underlying said hitch, and biasing means assembled between said arm and the flanges of the hitch to receive and cushion movement of the hitch in pivoting over the frame of the driven member in service.

4. A hitch for connecting the frames of a tractor and cutting member to operate the same together in service, which comprises a substantially horizontal web having upwardly directed longitudinally extending side flanges, a pair of horizontally spaced transverse parallel bars passing through the flanges of said hitch and being secured thereto, means securing the bars to the frame of the tractor, a pivot bolt securing the forward end portion of the hitch to the frame of the cutting member to pivot the hitch thereon, a retaining arm loosely assembled at one end on the rear parallel bar of the hitch and secured at the other end to the frame of the cutting member, and a coil spring assembled on said rear bar on each side of said arm between the same and the flanges of the hitch to receive and cushion movement of the hitch in pivoting over the frame of the cutting mechanism in service.

ARLEIGH G. HUPP.

REFERENCES CITED

The following references are of record in the file of this patent:

UNITED STATES PATENTS

| Number | Name | Date |
|---|---|---|
| 1,532,358 | Weidemann | Apr. 7, 1925 |
| 2,109,085 | Chilstrom et al. | Feb. 22, 1938 |
| 2,368,290 | Donald | Jan. 30, 1945 |

FOREIGN PATENTS

| Number | Country | Date |
|---|---|---|
| 264,312 | Great Britain | Jan. 20, 1927 |